US006505730B1

(12) United States Patent
Linder

(10) Patent No.: US 6,505,730 B1
(45) Date of Patent: Jan. 14, 2003

(54) DISTRIBUTION ARRANGEMENT FOR PACKAGES

(75) Inventor: Heinz Linder, Zofingen (CH)

(73) Assignee: Grapha-Holding AG, Hergiswil (CH)

( * ) Notice: Subject to any disclaimer, the term of this patent is extended or adjusted under 35 U.S.C. 154(b) by 0 days.

(21) Appl. No.: 09/690,160

(22) Filed: Oct. 17, 2000

(30) Foreign Application Priority Data

Oct. 21, 1999 (EP) .......................................... 99810958

(51) Int. Cl.[7] .............................................. B65G 47/68
(52) U.S. Cl. .................. 198/435; 198/370.01; 198/778
(58) Field of Search ............................... 198/778, 435, 198/370.01

(56) References Cited

U.S. PATENT DOCUMENTS

| | | | | | |
|---|---|---|---|---|---|
| 1,861,335 | A | * | 5/1932 | Cain et al. | 198/778 |
| 3,865,227 | A | * | 2/1975 | Kaak | 198/84 |
| 4,392,767 | A | * | 7/1983 | Ischebeck | 198/778 |
| 4,448,301 | A | * | 5/1984 | Alger | 198/778 |
| 4,493,414 | A | * | 1/1985 | Nevo-Hacohen | 198/800 |
| 5,010,808 | A | * | 4/1991 | Lanham | 198/778 |
| 5,054,602 | A | | 10/1991 | Kent et al. | |
| 5,291,987 | A | * | 3/1994 | Zink | 198/724 |
| 5,803,232 | A | * | 9/1998 | Froderberg | 198/778 |
| 6,065,463 | A | * | 5/2000 | Martin | 198/778 |

FOREIGN PATENT DOCUMENTS

| | | |
|---|---|---|
| FR | 2593416 | 7/1987 |
| GB | 816152 | 7/1959 |

OTHER PUBLICATIONS

Patent Abstracts of Japan, vol. 012, No. 432 (M–763), Nov. 15, 1988 & JP 63 165218 A (Hitachi Kiden Kogyo Ltd), Jul. 8, 1988.

* cited by examiner

*Primary Examiner*—Douglas Hess
(74) *Attorney, Agent, or Firm*—Friedrich Kueffner

(57) ABSTRACT

A distribution arrangement for packages has a first conveying device and one or more producing groups transferring packages onto the first conveying device. Target groups receive the packages from the first conveying device for further transport. The first conveying device forms a first closed loop arrangement and extends in at least two planes arranged above each other. At least one of the producing groups has at least two of the target groups correlated therewith, and the at least one of the producing groups and the at least two of the target groups correlated therewith are serially arranged along the first closed loop arrangement.

17 Claims, 1 Drawing Sheet

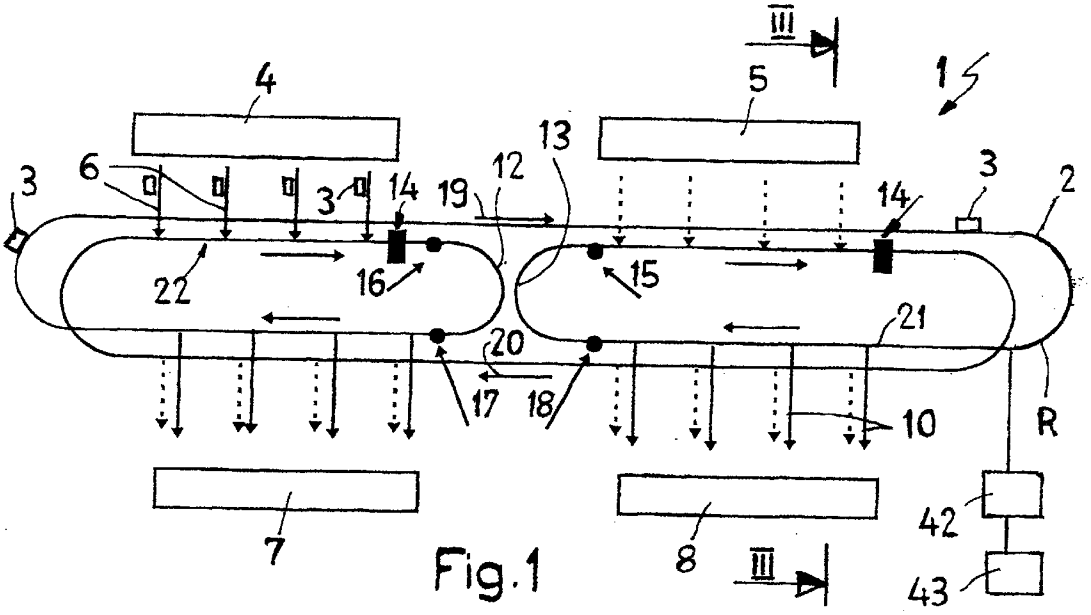
Fig.1
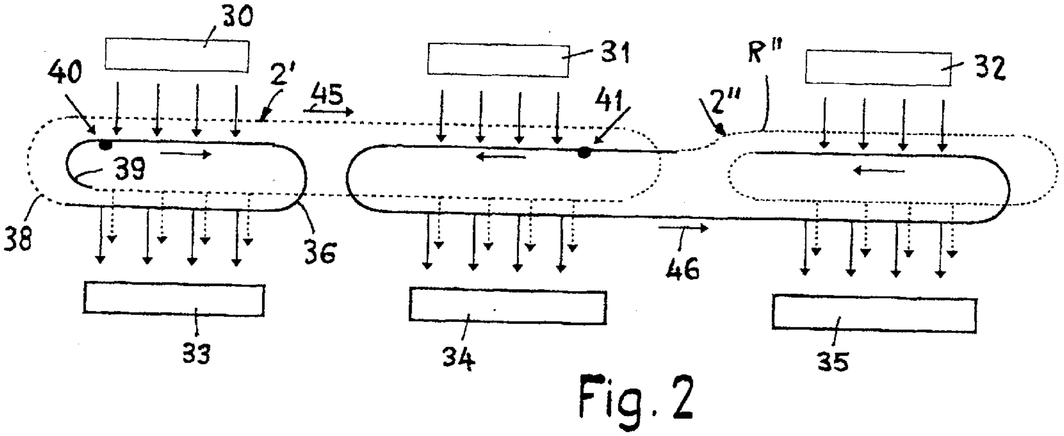
Fig. 2
Fig.3
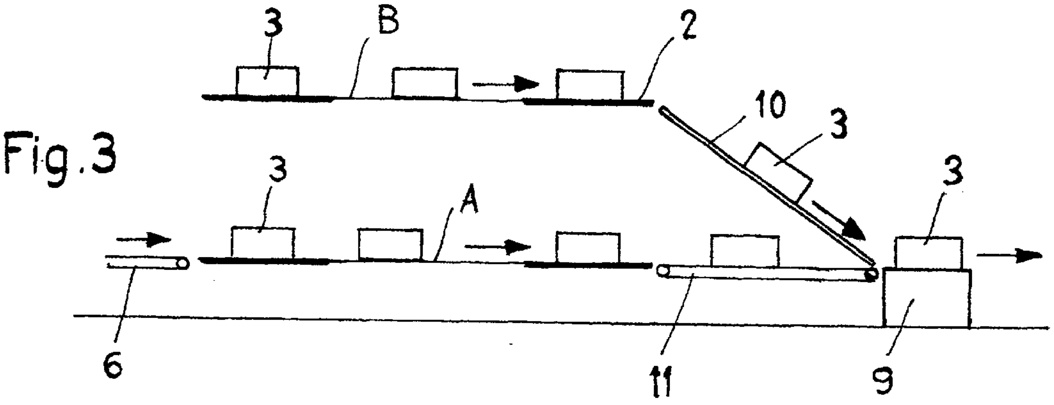

DISTRIBUTION ARRANGEMENT FOR PACKAGES

BACKGROUND OF THE INVENTION

1. Field of the Invention

The invention relates to a distribution arrangement for packages, comprising a conveying device and at least one producing group which transfers the packages onto the conveying device and with at least one target group which receives the packages from the conveying device for further transportation.

2. Description of the Related Art

Distribution arrangements of the aforementioned kind are known and are used, in particular, to transfer in a directed and controlled fashion addressed packages for delivery onto vehicles which are waiting at a loading ramp. The loaded vehicles transport the packages to sales or delivery locations, for example, to sales booths in a certain district. The packages are, in general, individually composed and addressed and, in individual situations, can be comprised only of a printed product.

A known arrangement comprises a U-shaped conveying device wherein on one leg a producing group and on the other leg the target group are arranged. Instead of a U-shaped conveying device it is also possible to use a closed loop arrangement which connects one producing group with one target group. In this situation, the output must be distributed onto several smaller conveyor systems which connect only a limited number of producing and target groups with one another. However, in order to be able to reach all target groups from all producing groups, an additional conveyor system, extending across all producing and target groups, must be provided which transports only a portion of the entire amount of packages. In this connection, the packages are transferred from the small to the higher order conveyor system. Such an arrangement is in operation at Süddeutsche Zeitung, a Munich, Germany, newspaper publishing company. A disadvantage of this device is that the transfer of packages from one conveying device to the other requires comparatively complex transfer means. This transfer moreover can result in disturbances in the material flow. Especially packages that are wrapped in foil can result in such disturbances. A further difficulty in regard to this device is that it is control-technologically comparatively complex because the packages must be transferred from one conveying system onto the other.

SUMMARY OF THE INVENTION

It is an object of the present invention to provide an arrangement of the aforementioned kind which eliminates the aforementioned difficulties. Despite of this requirement, the arrangement should be producible in a cost-efficient way and should be reliable with respect to its function.

In accordance with the present invention this is achieved in that the conveying arrangement forms a closed loop arrangement and extends at least over two planes atop one another and that at least one producing group and two target groups are arranged serially along the closed loop arrangement. According to the arrangement of the invention, the transfer of packages from one conveying member to another is not required so that disturbances based on transfer errors can be eliminated. It is moreover advantageous that the electronic tracking of packages is simpler than before because the cooperation of two or more mechanical transport systems is eliminated.

It is moreover advantageous that one producing group can reach at least two target groups before the second producing group will load the loop arrangement by placing packages thereon. Accordingly, the output relative to a single plane loop arrangement, which supplies two consumer (target) groups from two producing groups, is doubled for an identical transport speed.

In the case of a gap-free loading of the conveying device by a producing group, which, by the way, may be comprised also of a device unit, and a subsequent partial transfer of the packages to a target group, the resulting gaps can be refilled by packages of a producing group arranged downstream.

Alternatively, in the context of a gap-forming loading of the conveying device by a producing group, the gaps that are formed can be filled by packages of a producing group positioned downstream.

An important advantage of the device according to the invention is seen in that the loop arrangement extending on two planes positioned above each other can provide an intermediate buffering function between the producing groups and the target groups. With regard to this function, the packages must not leave the loop arrangement and therefore must not be transferred to a different system. Intermediately buffered packages, after a certain period of time, will pass again the target position for transfer without having to leave the system. For controlling the degree of filling of the intermediately buffered packages, simple algorithms can be derived which either throttle the producing groups or accelerate the transfer of the packages onto the target groups in order to prevent overflow of the device. The device according to the invention can thus be well realized electronically. An overload of the computer can thus be prevented even at high output.

The arrangement according to the invention is characterized thus by an increased output and by the possibility of an intermediate buffering with reduced computer expenditure.

BRIEF DESCRIPTION OF THE DRAWING

In the drawing:

FIG. 1 is a schematic view of a device according to the invention;

FIG. 2 is a schematic view of a variant of the device according to the invention; and FIG. 3 shows a section along the section line III—III of FIG. 1.

DESCRIPTION OF THE PREFERRED EMBODIMENTS

The device illustrated in FIG. 1 comprises a conveying device 2 which forms a closed loop arrangement R. The conveying device can be a device with a conveying member, not shown, for example, a conveying belt. It comprises a drive 42 as well as a control device 43. The controlled drive of such conveying devices 2 is known to a person skilled in the art, and, therefore, there is no need for further explanations in this context. The loop arrangement R extends according to FIG. 3 in a lower plane A as well as in an upper plane B spaced from the lower plane A. In the lower plane A an area which extends from point 15 to point 16 is provided. After the point 16, an ascending section 12 extends to the upper plane B. From the point 17 to the point 18 the loop arrangement R extends in the upper plane B. From the point 18 a descending section 13 leads again to the lower plane A and to point 15. The conveying direction is indicated by the two arrows 19 and 20. The loop arrangement R thus has two loops 21 and 22 each having an ascending section 12 or a descending section 13.

Each one of the loops 21 and 22 is provided with a producing group 4 or 5. With these producing groups 4 and 5, known to a person skilled in the art, the packages 3 are formed, for example, printed products (e.g. newspapers) are received from a rotary machine with package forming groups arranged downstream. The packages 3 are labeled (addressed) so as to be machine-readable and are transferred at the locations 6 of the conveying device 2 onto the loop arrangement R. The transfer is carried out, in general, with the conveying device 2 running. Shortly after the transfer, the packages 3 pass through a barcode reader 14 or any other suitable reading device which reads the address so that the packages 3 can be transported to a target position of the target group 7 or 8. These target groups 7 and 8 are arranged serially adjacent to one another. Ramps 9 are arranged according to FIG. 3 at these target groups 7 and 8 which are supplied by means of conveying members 10 and 11 and have arranged thereat the vehicles 44 to be loaded. The conveying members 10 convey, according to FIG. 3, the packages 3 from the upper plane B to the ramp 9 and the conveying members 11 convey the packages 3 in the lower plane A also to the ramp 9. It is possible to arrange simultaneously several parallel positioned ramps 9 at each target group 7 or 8.

From the producing group 5 the packages 3 can be transferred onto the target group 8 or, if desired, also to the subsequent target group 7. If, in case of a disturbance or for a different reason, it is not possible to transfer the packages 3 to the target groups 7 and 8, the packages which have not been transferred remain on the loop arrangement and pass the producing group 4 on their way on the upper loop 22 onto the upper plane B. Finally, these packages 3 are transported again via the loop 21 past the producing group 5 to the target groups 8 or 7. The loop arrangement R can thus accommodate packages which have not been transferred at the target groups 7 and 8. The loop arrangement R can accommodate the packages 3 until they have returned to the starting point 15. From this moment on, the producing group 5 must be stopped so that packages of the producing group 4 can be continued to be conveyed. For example, 100 packages of the producing group 5 can be circulating. The packages of the producing group 5 in this way, if needed, can be intermediately buffered for a certain amount of time without having to shut down the device.

Packages 3 of the producing group 4 reach the loop 22 and, via the ascending section 12, the upper plane B and, for example, pass the target group 7. Packages 3 which are not transferred here finally reach in this upper plane B the target group 8. It is now important in this context that based on the producing groups 4 and 5 two target groups 7 and 8 can be reached before the further producing group 5 or 4 loads the loop arrangement R. This provides an especially high output. For packages 3 of the producing group 4 there is also the possibility of intermediate buffering, as has been explained above.

The arrangement 1 comprises two planes A and B as well as two loops 21 and 22. In principle, an arrangement extending across more than two planes and with more than two loops is also possible. Conceivable is also an arrangement with only one producing group 4 or 5.

The distribution arrangement 1' according to FIG. 2 comprises two closed loop arrangements R' and R" which each have a conveying device 2' and 2". These conveying devices 2' and 2" are driven in the direction of arrows 45 and

46 and are controlled for a directed transfer of the packages 3. Both loop arrangements R' and R" extend across a lower plane A and an upper plane B, respectively. The areas illustrated in dotted lines extend in the upper plane B while the solid line illustration shows the areas extending in the lower plane A. Accordingly, each loop arrangement has an ascending section and a descending section.

In the loop arrangement R', the reference numeral 38 indicates the ascending section and the reference numeral 39 the descending section. A producing group 30 and two target groups 33 and 34 are arranged on the loop arrangement R'. Two producing groups 31 and 32 are arranged on the loop arrangement R". Two target groups 33 and 34 can be reached with them. In the area of the target group 34 the two loop arrangements R', R" overlap each other. At the target group 34 it is thus possible to transfer packages 3 of the loop arrangement R' as well as packages 3 of the loop arrangement R". The transfer onto a ramp, not illustrated, is carried out in the same way as in FIG. 3 by means of conveying members 10 and 11, which convey the packages within the lower plane A or move them down from the upper plane B. In the arrangement 1', one producing group 30 or 31 can reach two target groups 33 or 34 and 35 before the further producing group loads the loop arrangement R' or R". Packages which cannot be transferred can remain on the loop arrangement R' or R" so that in this arrangement an intermediate buffer function is also provided.

While specific embodiments of the invention have been shown and described in detail to illustrate the inventive principles, it will be understood that the invention may be embodied otherwise without departing from such principles.

What is claimed is:

1. A distribution arrangement for packages, the distribution arrangement comprising:

a first conveying device;

one or more producing groups configured to transfer packages onto the first conveying device;

target groups configured to receive the packages from the first conveying device for further transport;

wherein the first conveying device forms a first closed loop arrangement and extends in at least two planes arranged above each other, wherein the first closed loop arrangement is curved in a single direction of curvature; and wherein at least one of the producing groups has at least two of the target groups correlated therewith and wherein the at least one of the producing groups and the at least two of the target groups correlated therewith are serially arranged along the first closed loop arrangement.

2. The distribution arrangement according to claim 1, wherein at least two of the producing groups are provided and wherein the at least two target groups correlated therewith, respectively, when viewed in a conveying direction of the first closed loop arrangement, are arranged downstream of the producing groups, wherein downstream of each of the producing groups the target groups correlated therewith, respectively, are supplied with packages.

3. The distribution arrangement according to claim 2, wherein the first conveying device in a lower one of the at least two planes conveys packages from one of the producing groups to at least two target groups.

4. The distribution arrangement according to claim 1, wherein the first closed loop arrangement has at least one of an ascending section and a descending section.

5. The distribution arrangement according to claim 4, wherein the first closed loop arrangement comprises two loops each having one of the ascending and one of the descending sections.

6. The distribution arrangement according to claim 1, wherein a second conveying device in the form of a second closed loop arrangement, identical to the first loop arrangement, is provided and overlaps the first closed loop arrangement.

7. The distribution arrangement according to claim 6, wherein each one of the first and second closed loop arrangements has at least one of the target groups configured to be supplied by the first and second loop arrangements.

8. The distribution arrangement according to claim 6, wherein the first and second closed loop arrangements have a buffering function for packages not transferred onto the target groups.

9. The distribution arrangement according to claim 6, wherein the target groups have at least one ramp and wherein the first and second closed loop arrangements have conveying members configured to supply packages from an upper and a lower one of the at least two planes to the at least one ramp.

10. The distribution arrangement according to claim 6, further comprising a reader, configured to read addresses provided on the packages, arranged downstream of the at least one producing group on the first and second closed loop arrangement.

11. The distribution arrangement according to claim 10, wherein the reader is a barcode reader.

12. The distribution arrangement according to claim 6, wherein the packages are transferred at twice a spacing between the producing groups for filling in gaps between packages already positioned on the first and second closed loop arrangements.

13. The distribution arrangement according to claim 1, further comprising a reader, configured to read addresses provided on the packages, arranged downstream of the at least one producing group on the first closed loop arrangement.

14. The distribution arrangement according to claim 13, wherein the reader is a barcode reader.

15. The distribution arrangement according to claim 1, wherein the conveying device has a buffering function for packages not transferred onto the target groups.

16. The distribution arrangement according to claim 1, wherein the target groups have at least one ramp and wherein the first conveying device has conveying members configured to supply packages from an upper and a lower one of the at least two planes to the at least one ramp.

17. The distribution arrangement according to claim 1, wherein the packages are transferred at twice a spacing between the producing groups for filling in gaps between packages already positioned on the first and second closed loop arrangement.

* * * * *